United States Patent
Kurokawa et al.

[11] Patent Number: 6,054,675
[45] Date of Patent: Apr. 25, 2000

[54] SOLID WIRE FOR MAG WELDING

[75] Inventors: Tsuyoshi Kurokawa; Fusaki Koshiishi; Hiroyuki Shimizu; Takaaki Ito; Kazuhiko Ito, all of Fujisawa, Japan

[73] Assignee: Kabushiki Kaisha Kobe Seiko Sho, Kobe, Japan

[21] Appl. No.: 09/143,519

[22] Filed: Aug. 28, 1998

[30] Foreign Application Priority Data

Sep. 29, 1997 [JP] Japan .................................. 9-263679

[51] Int. Cl.[7] .................................................. B23K 35/00
[52] U.S. Cl. ................................. 219/146.1; 219/145.1; 148/22; 148/24
[58] Field of Search .............................. 219/146.1, 145.1; 148/22, 24

[56] References Cited

U.S. PATENT DOCUMENTS

| | | |
|---|---|---|
| 3,211,883 | 10/1965 | Zimmermann . |
| 5,550,348 | 8/1996 | Masaie et al. ............ 219/145.22 |

FOREIGN PATENT DOCUMENTS

| | | |
|---|---|---|
| 0 685 293 | 12/1995 | European Pat. Off. . |
| 5-131292 | 5/1993 | Japan . |
| 8-52572 | 2/1996 | Japan . |
| 9-99390 | 4/1997 | Japan . |
| 9-206984 | 8/1997 | Japan . |
| 10-80789 | 3/1998 | Japan . |
| 10-128576 | 5/1998 | Japan . |

OTHER PUBLICATIONS

Patent Abstracts of Japan, vol. 096, No. 002, Feb. 29, 1996, JP 07 251292, Oct. 3, 1995.
Patent Abstracts of Japan, vol. 095, No. 010, Nov. 30, 1995, JP 07 178588, Jul. 18, 1995.
Patent Abstracts of Japan, vol. 016, No. 428 (M–1307), Sep. 8, 1992, JP 04 147789, May 21, 1992.
Patent Abstracts of Japan, vol. 012, No. 347 (M–743), Sep. 19, 1988, JP 63 108996, May 13, 1988.
Patent Abstracts of Japan, vol. 096, No. 003, Mar. 29, 1996, JP 07 303995, Nov, 21, 1995.
V. A. Lenivkin, et al., Welding Production, vol. 25, No. 5, pp. 10–13, "The Effect of the Coating of Welding Wire on the Technological Properties of the Arc Running in Shielding Gases", May 5, 1978.

*Primary Examiner*—Patrick Ryan
*Assistant Examiner*—M. Alexandra Elve
*Attorney, Agent, or Firm*—Oblon, Spivak, McClelland, Maier & Neustadt, P.C.

[57] ABSTRACT

Described is a solid wire for MAG welding which has no copper plating on the wire surface and which has good welding workabilities such as a reduced amount of generated spatters and good arc stability in the MAG welding of steel sheets.

A solid wire for MAG welding comprises, as chemical components for the wire, 0.01 to 0.15 wt % of C, 0.20 to 1.00 wt % of Si, 0.70 to 1.70 wt % of Mn, 0.30 wt % or below of Ti, 0.025 wt % or below of S, 0.020 wt % or below of O, and the balance being Fe and inevitable impurities, wherein said wire is applied on the surface thereof with at least one compound serving as an arc stabilizer and selected from the group consisting of a K compound and a Cs compound in such a way that when an amount of the K compound to be applied to (calculated as K) is taken as Appm relative to the weight of said wire and an amount of the Cs compound (calculated as Cs) is taken as Bppm, a value of (A+3B) is in the range of 2 to 15 ppm. The wire has such a structure as not to be plated with copper on the surface thereof.

6 Claims, 2 Drawing Sheets

FIG. IA
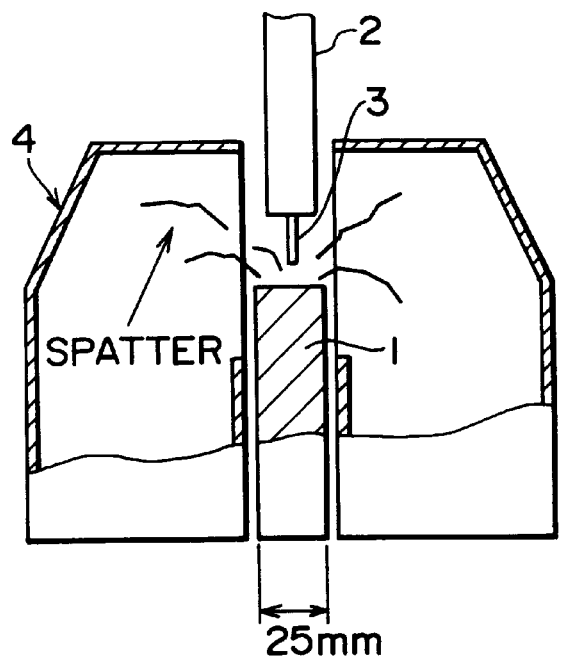
25mm
FIG. IB
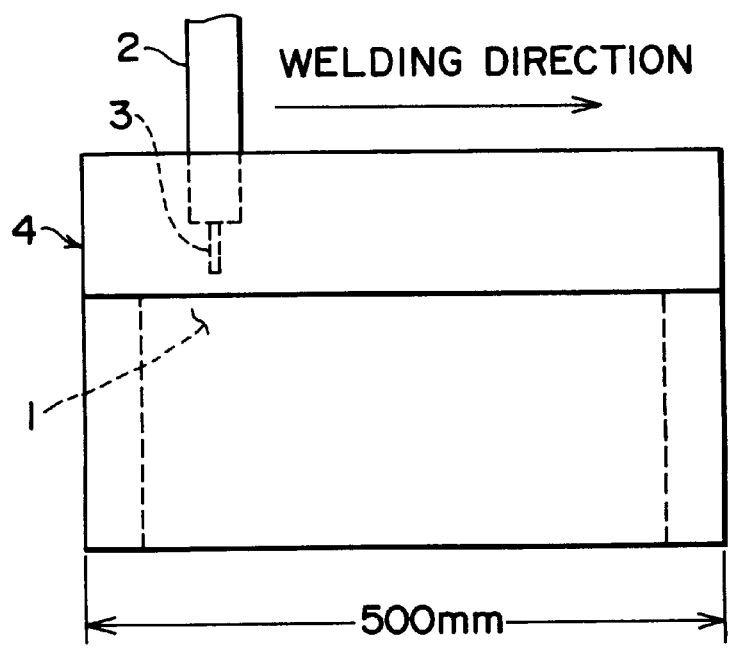
WELDING DIRECTION
500mm

SOLID WIRE FOR MAG WELDING

BACKGROUND OF THE INVENTION

1. Field of the Invention

This invention relates to the art of MAG welding, and more particularly, to a solid wire for MAG welding which has no copper plating on the wire surface and which has good welding workabilities such as a reduced amount of generated spatters and good arc stability in the MAG welding of steel sheets (such as mild steel and 490 N/mm² grade high tension steel sheets).

2. Description of the Prior Art

The term "MAG welding (metal active gas welding)" used herein is intended to mean arc welding wherein a welding wire, which is consumed as a welded metal, is used as an electrode, a mixed gas (e.g., 80% Ar+20% $CO_2$) composed of argon gas to which carbon dioxide or oxygen is added at a mixing rate of the oxidative gas of 10 to 30% is used as a shield gas, and the particle transfer proceeds as a spray transfer and so-called carbon dioxide welding is not included herein.

As a solid wire for such MAG welding as mentioned above, it is usual to use a so-called copper-plated solid wire wherein copper is plated on the wire surface. The reason why copper is plated is to improve electric conductivity and a corrosion resistance.

We have observed an arc phenomenon of MAG welding by use of a video camera for high speed recording and reproduction (capable of taking 2000 frames per second). As a result, it has been found that with copper-plated solid wires, the surface tension of transfer particles released and separated from the wire tip is smaller than that attained by a wire having no copper plating thereon. In fact, the particles are not in a spherical form, but in the form of an ellipsoid elongated toward the transfer direction (i.e. a dropping direction) (see FIG. 3). This may cause an instantaneous short-circuiting phenomenon wherein particles being transferred from the wire tip to a melt pool of a base metal are connected to one another to cause short-circuiting for a very short time. Eventually, once connected particles are broken into pieces and scattered to cause spatter generation.

When using a copper-plated solid wire in long-time welding such, for example, as by a welding robotic system, the wire is rubbed within an elongated conduit tube (or conduit liner) guiding a wire from a wire feeder to a welding torch body. As a consequence, copper dust is accumulated in the tube, thereby causing an arc to become unstable owing to the failure in the feed of the wire. This leads to the disadvantage that the tip of the wire is run into the melt pool, thereby causing the spatter generation.

SUMMARY OF THE INVENTION

An object of the invention is to provide a solid wire for MAG welding which overcomes such disadvantages as experienced in copper-plated solid wires for MAG welding, which has such a structure that no copper is plated on the wire surface, and in which spatter generation can be reduced in degree in the course of the MAG welding, ensuring good arc stability.

In order to achieve the above object, there is provided, according to one embodiment of the present invention, a solid wire for MAG welding which comprises, as chemical components for the wire, 0.01 to 0.15 wt % of C, 0.20 to 1.00 wt % of Si, 0.70 to 1.70 wt % of Mn, 0.30 wt % or below of Ti, 0.025 wt % or below of S, 0.020 wt % or below of O, and the balance being Fe and inevitable impurities, wherein the wire is applied with at least one compound serving as an arc stabilizer and selected from the group consisting of a K compound and a Cs compound in such a way that when an amount of the K compound to be applied to (calculated as K) is taken as Appm relative to the weight of the wire and an amount of the Cs compound (calculated as Cs) is taken as Bppm, a value of (A+3B) is in the range of 2 to 15 ppm, without plating of copper on the surface of the wire.

According to another embodiment of the invention, there is also provided a solid wire for MAG welding which comprises, as chemical components for the wire, 0.01 to 0.15 wt % of C, 0.20 to 0.90 wt % of Si, 0.70 to 1.70 wt % of Mn, 0.30 wt % or below of Ti, 0.025 wt % or below of S, 0.020 wt % or below of O, and the balance being Fe and inevitable impurities, wherein the wire is applied with at least one compound serving as an arc stabilizer and selected from the group consisting of a K compound and a Cs compound in such a way that when an amount of the K compound to be applied to (calculated as K) is taken as Appm relative to the weight of the wire and an amount of the Cs compound (calculated as Cs) is taken as Bppm, a value of (A+3B) is in the range of 2 to 15 ppm, without plating of copper on the surface of the wire.

According to a further embodiment of the invention, there is provided a solid wire for MAG welding which comprises, as chemical components for the wire, 0.03 to 0.10 wt % of C, 0.20 to 0.70 wt % of Si, 0.80 to 1.50 wt % of Mn, 0.04 to 0.20 wt % of Ti, 0.003 wt % to 0.015 of S, 0.003 to 0.015 wt % of O, and the balance being Fe and inevitable impurities, wherein the wire is applied with at least one compound serving as an arc stabilizer and selected from the group consisting of a K compound and a Cs compound in such a way that when an amount of the K compound to be applied to (calculated as K) is taken as Appm relative to the weight of the wire and an amount of the Cs compound (calculated as Cs) is taken as Bppm, a value of (A+3B) is in the range of 2 to 15 ppm, without plating of copper on the surface of the wire.

In those embodiments set out above, the solid wire should preferably satisfy the following relationship: (C+Si/7+Mn/10)=0.15 to 0.32 wt %. Further, the chemical components of the wire should preferably further comprise 0.001 to 0.05 wt % of Cu. In addition, it is also preferred that the wire is applied on the surface thereof with $MoS_2$ in an amount of 0.1 to 1.0 g per 10 kg of the wire.

The solid wire for MAG welding according to the invention has such a structure that any copper is not plated on the wire surface, and is optimized in the wire composition, so that the surface tension of particles established in the course of MAG welding is so appropriately controlled that the particles or globules are not elongated but are kept substantially in the form of spheres. Moreover, a certain amount of an arc stabilizer is applied onto the wire surface to ensure particles with a small size, so that the particles can be regularly, smoothly transferred to a base metal. Thus, unlike copper-plated solid wires, the wire of the invention can suppress the occurrence of the instantaneous short-circuiting phenomenon which will cause the generation of spatters. With non-copper-plated wires, a plating step can be omitted from a wire manufacturing process, with the attendant advantage that handling of noxious substances, e.g. copper cyanide, copper sulfate, copper pyrophosphate and the like, contained in waste liquors of plating are unnecessary.

BRIEF DESCRIPTION OF THE DRAWINGS

FIGS. 1A and 1B are, respectively, a schematic plan view, partially cut away, illustrating measurement of spatters in MAG welding, and a schematic side view for the illustration;

DETAILED DESCRIPTION OF THE INVENTION

Figure 2:
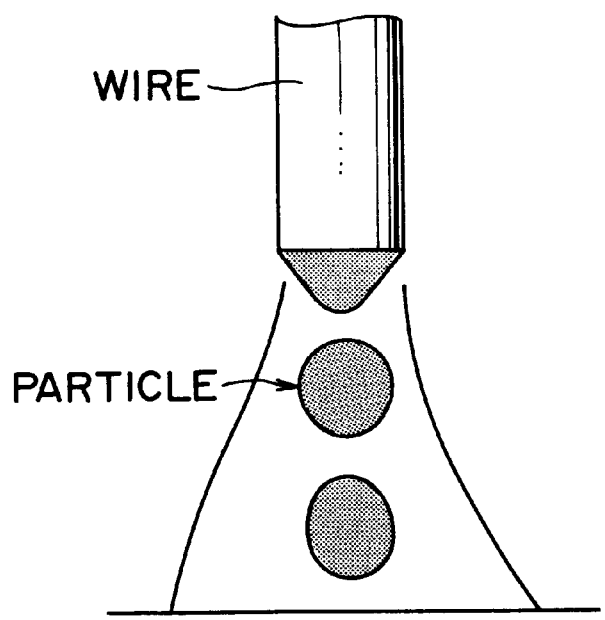
FIG. 2 is a schematic view illustrating particle transfer when a solid wire having no copper plating thereon is used for MAG welding.
Figure 3:
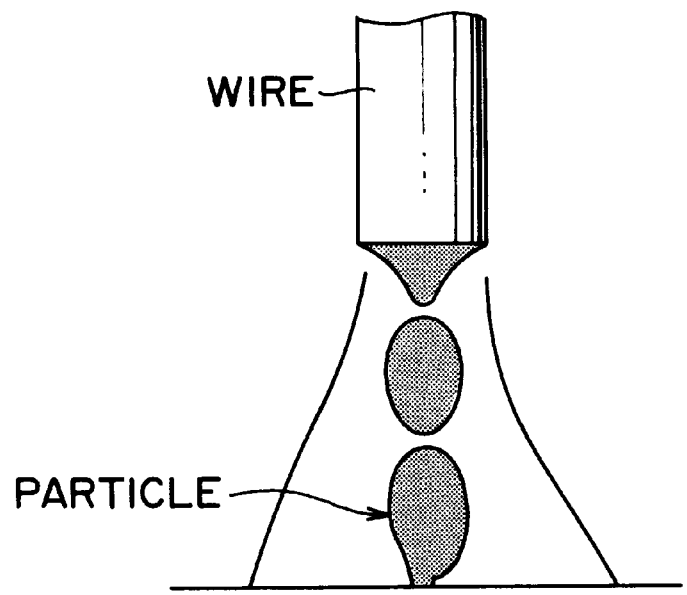
FIG. 3 is a schematic view illustrating particle transfer when a copper-plated solid wire is used for MAG welding.

The invention is described in detail. Initially, it is illustrated that the solid wire of the invention for MAG welding is one which is free of any copper plating on the wire surface. FIG. 2 schematically illustrates how particles are transferred in the course of MAG welding when a copper plating-free solid wire is used. Likewise, FIG. 3 schematically illustrates how particles are transferred when a copper-plated solid wire is used for MAG welding.

The results of the observation (by use of a high-speed video camera) of an arc phenomenon made by us reveal that in the MAG welding with a copper-plated solid wire, the surface tension of particles is small by the influence of the copper plating. As is shown in FIG. 3, the particles are not in a spherical form, but is in the form of an ellipsoid which is elongated along the transfer direction (vertical directions). This may cause an instantaneous short-circuiting phenomenon wherein the particles being transferred mutually combine together, and the wire tip is contacted with a melt pool for a very short time to cause short-circuiting. The particles formed at the tip of the wire fluctuates, bringing about a variation in cycles of the particle transfer.

To avoid this, the solid wire of the invention for MAG welding is not subjected to copper plating, which causes the surface tension of the particles to be lowered in excess, and has such a structure having no copper plating. Moreover, the composition of the wire is optimized, so that the surface tension of the particles is appropriately controlled so as to make substantially a spherical form of the particles as is particularly shown in FIG. 2.

In order to make small-size particles, the wire of the invention is preferably applied thereon with a K compound and/or a Cs compound, which is an alkali metal arc stabilizer, on the surface of the wire. More particularly, a K compound and/or a Cs compound has such a low ionization potential that electrons are readily released. Accordingly, the gradient of arc potential lowers to facilitate creeping-up of the arc toward the particles, thus permitting the arc to generate as wrapping a particle therewith at the wire tip. This promotes the separation and transfer of the particle, under which the particle is made small in size and smoothly transferred. In combination with the optimization of the wire composition, the occurrence of the above-mentioned instantaneous short-circuiting phenomenon, which causes the spatter generation, can be reduced.

The K compounds to be applied onto the wire surface include inorganic compounds such as potassium carbonate or organic compounds such as potassium stearate, and the Cs compounds may be inorganic compounds such as cesium carbonate.

In the practice of the invention, it is preferred that an appropriate amount of $MoS_2$ is coated onto the wire surface as a lubricant for smooth wire feed. When the wire is passed through a conduit tube for wire feed, the frictional force (feed resistance) can be made smaller to realize smooth wire feed. This enables one to extremely reduce the generation of spatters owing to the instability of an arc, which is, in turn, caused by the feed instability of the wire.

The application or coating of a K compound, a Cs compound and/or $MoS_2$ on the wire surface may be carried out, after completion of wire drawing, by a method of contact coating using, for example, a buff, or a method of electrostatic coating. The K compound, Cs compound and/or $MoS_2$ may be separately coated, or a mixture of these compounds may be coated. Alternatively, these compounds may be dissolved or dispersed in an oil for wire feed and applied onto the wire. Still alternatively, these compounds may be added to lubricants for wire drawing used in an intermediate or final dice in the wire drawing process and attached to or applied onto the wire surface at the time of wire drawing. Thus, the manner of the application or coating, which is adapted for the wire manufacturing process, may be appropriately selected.

The chemical components in the wire are, respectively, limited within certain ranges in the practice of the invention, and the reasons for the limitation are described below.

C is an essential component for appropriately keeping the surface tension of particles in copper plating-free solid wires and also for reducing the degree of spattering caused by the instantaneous short-circuiting phenomenon in MAG welding. However, when the amount of C is less than 0.01 wt %, the surface tension of the resultant particles becomes smaller than expected, and such effects as mentioned above cannot be shown. On the other hand, when the content of C exceeds 0.15 wt %, the surface tension of particles becomes too great, so that the particles at the wire tip are repulsed by the force of an arc and scatter in the form of large-sized spatters. This increases the amount of generated spatters. Accordingly, the amount of C ranges from 0.01 to 0.15 wt %. From the standpoint of a lower degree of spattering, it is preferred that the amount ranges from 0.03 to 0.10 wt %.

Si is an essential component for appropriately keeping the surface tension of particles in copper plating-free solid wires and for reducing the degree of spattering caused by the instantaneous short-circuiting phenomenon in MAG welding. If the amount of Si is less than 0.20 wt %, the surface tension of the particles becomes smaller than expected, with no such effects as mentioned above being shown. On the other hand, when the amount exceeds 1.00 wt %, the surface tension of the particles becomes too great, so that the particles at the wire tip are repulsed by the force of an arc and scatter in the form of large-sized spatters. This conversely increases the amount of generated spatters. Accordingly, the amount of Si ranges from 0.20 to 1.00 wt %. From the standpoint of a lower degree of spattering, the amount preferably ranges from 0.2 to 0.9 wt %, more preferably from 0.20 to 0.70 wt %.

Mn is an essential component for appropriately keeping the surface tension of particles in copper plating-free solid wires and for reducing the degree of spattering caused by the instantaneous short-circuiting phenomenon in MAG welding. If the amount of Mn is less than 0.70 wt %, the surface tension of the particles becomes smaller than expected, with no such effects as mentioned above being shown. On the other hand, when the amount exceeds 1.70 wt %, the surface tension of the particles becomes too great, so that the particles at the wire tip are repulsed by the force of an arc and scatter in the form of large-sized spatters. This conversely increases the amount of generated spatters. Accordingly, the amount of Mn ranges from 0.70 to 1.70 wt %. From the standpoint of a lower degree of spattering, the amount preferably ranges from 0.80 to 1.50 wt %.

Ti is an essential component for appropriately keeping the surface tension of particles in copper plating-free solid wires and for reducing the degree of spattering caused by the instantaneous short-circuiting phenomenon in MAG welding. The reason why the amount of Ti is 0.30 wt % or below is that when the amount exceeds the value defined above, the surface tension of the particles becomes too great, so that the particles at the wire tip are repulsed by the force of an arc and scatter in the form of large-sized spatters. This conversely increases the amount of generated spatters. Ti has the effect of stabilizing an arc in a range of moderate to large electric currents (200 to 350 A). When the amount of Ti is in the range of 0.04 to 0.20 wt %, not only the arc stabilization, but also a low degree of spattering can be realized. If the amount is less than 0.04 wt %, the surface tension of the resultant particles becomes small, thus leading to an increase in amount of spatters ascribed to the instantaneous short-circuiting phenomenon.

S is an essential component for appropriately keeping the surface tension of particles in copper plating-free solid wires and for reducing the degree of spattering caused by the instantaneous short-circuiting phenomenon in MAC welding. The reason why the amount of S is 0.025 wt % or below is that when the amount exceeds the value defined above, the surface tension of the particles becomes too great, with such effects as mentioned above being not shown. Moreover, the crack resistance degrades. The optimum range for realizing a low degree of spattering is from 0.003 to 0.015 wt %. If the amount is less than 0.003 wt %, the surface tension of the resultant particles increases, with an increasing number of large-sized spatters for the reason that the particle at the wire tip is repulsed by the arc force. Thus, the lower limit in amount of S is preferably 0.003 wt %.

O is a component greatly influencing the surface tension of the particles, and is an essential component for appropriately keeping the surface tension of the particles in copper plating-free solid wires and reducing the number of spatters as is caused by the instantaneous short-circuiting phenomenon in the MAG welding. The reason why the amount of O is 0.020 wt % or below is that when the amount exceeds the above-defined value, the surface tension becomes too small, and such effects as mentioned above cannot be shown along with the degradation of crack resistance. The optimum range for realizing a low degree of spattering is from 0.003 to 0.015 wt %. The reason why the lower limit in amount of O is defined at 0.003 wt % is that smaller amounts result in a greater surface tension of the particles, with an increasing number of large-sized spatters by repulsion of the particle at the wire tip by arc force.

In the practice of the invention, at least one of a K compound and a Cs compound is applied onto the surface of the wire as an arc stabilizer. In this case, when the amount of the K compound (calculated as K) being applied to is taken as A ppm and the amount of the Cs compound (calculated as Cs) is taken as B ppm, the following relation should preferably be satisfied: (A+3B)=2 to 15 ppm. If the value of (A+3B) of the stabilizer is less than 2 ppm the creeping up of the arc toward the particle at the wire tip is not satisfactory, so that there cannot be obtained the effect of forming a small-size particle transferred to a base metal. On the other hand, when the value exceeds 15 ppm, the stabilizer is removed from the wire surface within a conduit tube for wire feed, where the arc stabilizer remains in large amounts. This causes the generation of spatters because of the unstability of an arc caused by the unstability in feed of the wire.

The amount of a K and/or Cs compound applied onto the wire surface is measured in the following manner. (1) The wire attached with a K compound and/or a Cs compound is cut into pieces to provide about 20 g of cut wire samples for measurement with a length of about 20 to 30 mm. (2) A solution of hydrochloric acid, to which hydrogen peroxide is added, is poured into a quartz beaker, in which the cut wire samples are immersed for several seconds and removed from the beaker. Thereafter, the solution in the beaker is filtered. (3) The resultant filtrate is subjected to measurement according to the atomic absorption method.

In the practice of the invention, it is preferred that a value of $X=(C+Si/7+Mn/10)$ is in the range of 0.15 to 0.32 wt %. X is a parameter which is effective in reducing the generation of spatters while keeping the surface tension of particles in the MAG welding using a copper plating-free solid wire. In order that the value of X is within a range of 0.15 to 0.32 wt %, the amounts of C, Si and Mn are mutually controlled, by which the generation of spatters caused by the instantaneous short-circuiting phenomenon and also by the arc repulsive force can be reduced.

Cu is an element for improving the corrosion resistance of the wire. If the amount of Cu is less than 0.001 wt %, such an effect is not satisfactorily shown. On the other hand, when the amount exceeds 0.05 wt %, the surface tension of the particles lowers, resulting in an increase in amount of spatters due to the instantaneous short-circuiting phenomenon. Accordingly, the amount of Cu is in the range of from 0.001 to 0.05 wt %.

In the practice of the invention, it is preferred to apply $MoS_2$ to the wire surface in an amount of 0.1 to 1.0 g per 10 kg of the wire. If the amount of $MoS_2$ serving as a lubricant for wire feed is less than 0.1 g per 10 kg of the wire, the frictional force becomes too large on passage of the wire through the conduit tube, with the great possibility of the wire feed becoming unstable. On the other hand, when the amount exceeds 1.0 g, the compound is dropped off in the conduit tube in relatively large amounts, with the possibility of the wire feed becoming unstable as well. This leads to a large amount of spatters generated owing to the unstability of the arc caused by the feed unstability.

The invention is more particularly described by way of examples. Comparative examples are also described.

EXAMPLES

Solid wires for MAG welding (including wires for comparison indicated in Table 2 and wires of the invention indicated in Table 3), which individually had a structure without any copper plating on the wire surface and had a wire diameter of 1.2 mm, were made. Potassium stearate was used as a K compound to be applied on the wire surface and cesium carbonate was used as a Cs compound.

These wire samples were used for the MAG welding under welding conditions indicated in Table 1, whereupon an amount of generated spatters was measured to evaluate an effect of reducing the spatters.

Reference is now made to FIGS. 1A and 1B which are, respectively, a schematic plan view, partially cut away, illustrating the measurement of spatters in MAG welding and a side view of FIG. 1A. In these figures, indicated by 1 is a test sheet, by 2 is a welding torch, by 3 is a wire, and by 4 is a spatter collection box. The welding was carried out in a downward bead-on-plate manner under welding conditions indicated in Table 1. The amount of generated spattered was determined as follows: the hollow spatter-collecting box 4 made of copper, as shown in these figures, was used to collect spatters scattering around an arc point, and the weight of the collected spatters was measured. The measuring time (welding time) was set at 1 minute to determine a weight per unit time (mg/minute). The wire feedability, which had relation with the amount of generated spatters, could be determined when a predetermined amount or more of a wire was used for continuous welding. Accordingly, while taking into account the influence of $MoS_2$ and the arc stabilizers (K, Cs) on the wire feeding property or feedability in the measurement of spatters as shown in FIGS. 1A and 1B, wires to be tested were each subjected to continuous welding in an amount of 5 kg, after which the feedability was effected on the testing wire.

The results are shown in Tables 2 and 3. The amount of the generated spatters was evaluated as "◎" (very excellent) wherein the amount of generated spatters is less than 1000 mg/minute, as "○" (good) wherein the amount of generated spatters is from 150 mg/minute to less than 1500 mg/minute, as "Δ" (slightly poor) wherein the amount of generated spatters is from 1500 mg/minute to less than 2000 mg/minute, and as "X" (poor) wherein the amount of generated spatters is not less than 2000 mg/minute.

TABLE 1

Tested steel sheet: JIS G 3106 SM490B
Shielding gas: 80% Ar + 20% $CO_2$, flow rate of 20 liters/minute
Welding current: 280 A
Welding voltage: 32 V
Welding speed: 40 cm/minute
Wire Extension flat position: 25 mm
Welding polarity: DCEP
Welding Position: bead-on-plate welding The results of the test reveal that the wires of Comparative Example Nos. 1 to 12 do not meet any of the requirements defined in the present invention, and the amount of generated spatters in the MAG welding was large. More particularly, sample Nos. 1 to 5 have wire components outside the ranges defined in the present invention, and the surface tension of particles becomes too small, so that large amounts of spatters ascribed to the instantaneous short-circuiting phenomenon are generated. Although sample No. 6 satisfies the defined values of the wire components, no arc stabilizer was deposited, and spatters are generated in a large amount owing to the instantaneous short-circuiting phenomenon. Sample No. 7 meets the requirements for the defined values of the wire components, but with the amount of the coated arc stabilizer exceeding the upper limit, resulting in a large amount of spatters generated owing to the arc unstability. Sample No. 8 contains C in an amount exceeding its upper limit. Likewise, sample No. 9 has an exceeding amount of Si, sample No. 10 has an exceeding amount of Mn, and sample No. 11 has an exceeding amount of Ti. As a result, in all the cases, the surface tension of the particles becomes too great, so that the particle at the wire tip is repulsed by the arc force and large-sized spatters scatter, thus leading to the generation of spatters in large amounts.

In contrast, in all the examples of the invention (Nos. 12 to 23), the amount of generated spatters can be reduced. Especially, with sample Nos. 16, 18 and 20, the wire components are optimized along with optimum amounts of

TABLE 2

| Test Samples | Nos. | Chemical Components of Wire (wt %) | | | | | | | | C + Si/7 + Mn/10 wt % | K ppm | Cs ppm | K + 3Cs ppm | $MoS_2$ g/10 kg | Evaluation on Spattering |
|---|---|---|---|---|---|---|---|---|---|---|---|---|---|---|---|
| | | C | Si | Mn | Ti | S | O | Cu | Fe | | | | | | |
| Comparative | 1 | 0.007 | 0.45 | 0.85 | 0.19 | 0.012 | 0.005 | 0.005 | balance | 0.16 | 10 | 0 | 10 | — | x |
| Examples | 2 | 0.035 | 0.15 | 0.80 | 0.20 | 0.011 | 0.006 | 0.005 | balance | 0.14 | 9 | 0 | 9 | — | x |
| | 3 | 0.035 | 0.70 | 0.43 | 0.13 | 0.008 | 0.006 | 0.005 | balance | 0.18 | 3 | 0 | 3 | 1.34 | x |
| | 4 | 0.036 | 0.68 | 1.50 | 0.11 | 0.028 | 0.009 | 0.005 | balance | 0.28 | 8 | 0 | 8 | 0.52 | Δ |
| | 5 | 0.052 | 0.78 | 1.55 | 0.06 | 0.012 | 0.026 | 0.005 | balance | 0.32 | 7 | 0 | 7 | — | x |
| | 6 | 0.043 | 0.55 | 1.32 | 0.08 | 0.012 | 0.014 | 0.005 | balance | 0.25 | 0 | 0 | 0 | — | x |
| | 7 | 0.035 | 0.55 | 1.36 | 0.10 | 0.013 | 0.012 | 0.005 | balance | 0.25 | 8 | 3 | 17 | — | x |
| | 8 | 0.221 | 0.77 | 0.47 | 0.13 | 0.008 | 0.006 | 0.005 | balance | 0.38 | 0 | 1 | 3 | — | Δ |
| | 9 | 0.086 | 1.08 | 1.26 | 0.14 | 0.003 | 0.005 | 0.005 | balance | 0.36 | 9 | 0 | 9 | — | Δ |
| | 10 | 0.085 | 0.71 | 1.93 | 0.19 | 0.003 | 0.004 | 0.005 | balance | 0.38 | 5 | 0 | 5 | — | Δ |
| | 11 | 0.070 | 0.65 | 1.59 | 0.33 | 0.003 | 0.012 | 0.005 | balance | 0.32 | 0 | 2 | 6 | — | Δ |

TABLE 3

| Test Samples | Nos. | Chemical Components of Wire (wt %) | | | | | | | | C + Si/7 + Mn/10 wt % | K ppm | Cs ppm | K + 3Cs ppm | $MoS_2$ g/10 kg | Evaluation on Spattering |
|---|---|---|---|---|---|---|---|---|---|---|---|---|---|---|---|
| | | C | Si | Mn | Ti | S | O | Cu | Fe | | | | | | |
| Examples | 12 | 0.013 | 0.66 | 1.53 | 0.19 | 0.021 | 0.013 | 0.005 | balance | 0.26 | 7 | 2 | 13 | 0.13 | ○ |
| Invention | 13 | 0.032 | 0.82 | 1.61 | 0.16 | 0.005 | 0.006 | 0.005 | balance | 0.31 | 8 | 0 | 8 | 0.27 | ○ |
| | 14 | 0.082 | 0.33 | 1.28 | 0.23 | 0.013 | 0.007 | 0.005 | balance | 0.25 | 2 | 1 | 5 | 0.85 | ○ |
| | 15 | 0.030 | 0.21 | 0.81 | 0.05 | 0.013 | 0.007 | 0.005 | balance | 0.14 | 11 | 0 | 11 | 0.51 | ○ |
| | 16 | 0.032 | 0.43 | 0.81 | 0.05 | 0.012 | 0.007 | 0.005 | balance | 0.17 | 12 | 0 | 12 | 0.85 | ◎ |
| | 17 | 0.044 | 0.56 | 1.29 | 0.16 | 0.006 | 0.011 | 0.070 | balance | 0.25 | 4 | 0 | 4 | 0.32 | ○ |
| | 18 | 0.044 | 0.54 | 1.32 | 0.16 | 0.006 | 0.012 | 0.005 | balance | 0.25 | 0 | 1 | 3 | 0.30 | ◎ |
| | 19 | 0.045 | 0.54 | 1.30 | 0.17 | 0.006 | 0.018 | 0.005 | balance | 0.25 | 2 | 1 | 5 | 0.33 | ○ |
| | 20 | 0.094 | 0.49 | 1.48 | 0.14 | 0.004 | 0.005 | 0.005 | balance | 0.31 | 3 | 1 | 6 | 0.35 | ◎ |
| | 21 | 0.093 | 0.68 | 1.49 | 0.14 | 0.005 | 0.005 | 0.005 | balance | 0.34 | 6 | 0 | 6 | 0.37 | ○ |
| | 22 | 0.088 | 0.49 | 1.44 | 0.14 | 0.003 | 0.006 | 0.005 | balance | 0.30 | 5 | 0 | 5 | 0.05 | ○ |
| | 23 | 0.080 | 0.53 | 1.44 | 0.16 | 0.003 | 0.006 | 0.005 | balance | 0.30 | 7 | 0 | 7 | 1.52 | ○ | the arc stabilizer and the lubricant for wire feed being applied onto the wire, so that the amount of generated spatters can be remarkably reduced to about the half or below of those attained in the comparative examples, and the welding can be performed under good stability of an arc.

As stated hereinabove, the solid wire of the invention for MAG welding has no copper plated on the surface thereof, and has an optimum composition so that the surface tension of particles in the MAG welding can be appropriately controlled to provide the particles substantially in a spherical form. Moreover, the wire is applied with a predetermined amount of an arc stabilizer, so that the resultant particles become small in size and can be regularly, smoothly transferred to a base metal. Unlike copper-plated solid wires, this solid wire can suppress the occurrence of an instantaneous short-circuiting phenomenon which causes the generation of spatters. In this way, the MAG welding can be performed at a low degree of spatter generation, thus ensuring good welding workability

What is claimed is:

1. A solid wire for MAG welding which comprises, as chemical components for the wire, 0.01 to 0.15 wt % of C, 0.20 to 1.00 wt % of Si, 0.70 to 1.70 wt % of Mn, 0.30 wt % or below of Ti, 0.025 wt % or below of S, 0.020 wt % or below of O, and the balance being Fe and inevitable impurities, wherein said wire is applied on the surface thereof with at least one compound serving as an arc stabilizer and selected from the group consisting of a K compound and a Cs compound in such a way that when an amount of the K compound to be applied to (calculated as K) is taken as Appm relative to the weight of said wire and an amount of the Cs compound (calculated as Cs) is taken as Bppm, a value of (A+3B) is in the range of 2 to 15 ppm, without plating of copper on the surface of said wire.

2. A solid wire for MAG welding which comprises, as chemical components for the wire, 0.01 to 0.15 wt % of C, 0.20 to 0.90 wt % of Si, 0.70 to 1.70 wt % of Mn, 0.30 wt % or below of Ti, 0.025 wt % or below of S, 0.020 wt % or below of O, and the balance being Fe and inevitable impurities, wherein said wire is applied on the surface thereof with at least one compound serving as an arc stabilizer and selected from the group consisting of a K compound and a Cs compound in such a way that when an amount of the K compound to be applied to (calculated as K) is taken as Appm relative to the weight of said wire and an amount of the Cs compound (calculated as Cs) is taken as Bppm, a value of (A+3B) is in the range of 2 to 15 ppm, without plating of copper on the surface of said wire.

3. A solid wire for MAG welding which comprises, as chemical components for the wire, 0.03 to 0.10 wt % of C, 0.20 to 0.70 wt % of Si, 0.80 to 1.50 wt % of Mn, 0.04 to 0.20 wt % of Ti, 0.003 to 0.015 wt % of S, 0.003 to 0.015 wt % of O, and the balance being Fe and inevitable impurities, wherein said wire is applied on the surface thereof with at least one compound serving as an arc stabilizer and selected from the group consisting of a K compound and a Cs compound in such a way that when an amount of the K compound to be applied to (calculated as K) is taken as Appm relative to the weight of said wire and an amount of the Cs compound (calculated as Cs) is taken as Bppm, a value of (A+3B) is in the range of 2 to 15 ppm, without plating of copper on the surface of said wire.

4. A solid wire for MAG welding according to claim 1, wherein a value of (C+Si/7+Mn/10) is in the range of 0.15 to 0.32 wt %.

5. A solid wire for MAG welding according to claim 1, wherein said wire further comprises 0.001 to 0.05 wt % of Cu.

6. A solid wire for MAG welding according to claim 1, wherein said wire has 0.1 to 1.0 g of $MoS_2$ on the surface thereof based on 10 kg of said wire.

* * * * *